(12) United States Patent
Makino et al.

(10) Patent No.: US 9,200,687 B2
(45) Date of Patent: Dec. 1, 2015

(54) MECHANICAL TYPE DISC BRAKE

(71) Applicant: NISSIN KOGYO CO., LTD., Nagano (JP)

(72) Inventors: Koji Makino, Nagano (JP); Yuki Urashima, Nagano (JP)

(73) Assignee: NISSIN KOGYO CO., LTD, Nagano (JP)

( * ) Notice: Subject to any disclaimer, the term of this patent is extended or adjusted under 35 U.S.C. 154(b) by 207 days.

(21) Appl. No.: 13/869,560

(22) Filed: Apr. 24, 2013

(65) Prior Publication Data
US 2013/0284545 A1    Oct. 31, 2013

(30) Foreign Application Priority Data
Apr. 26, 2012 (JP) .................................. 2012-100814

(51) Int. Cl.
| | | |
|---|---|---|
| F16D 55/22 | (2006.01) | |
| F16D 55/227 | (2006.01) | |
| F16D 65/18 | (2006.01) | |
| F16D 121/04 | (2012.01) | |
| F16D 121/14 | (2012.01) | |

(Continued)

(52) U.S. Cl.
CPC .............. F16D 55/22 (2013.01); F16D 55/227 (2013.01); F16D 65/18 (2013.01); F16D 2121/04 (2013.01); F16D 2121/14 (2013.01); F16D 2123/00 (2013.01); F16D 2125/40 (2013.01); F16D 2125/60 (2013.01)

(58) Field of Classification Search
CPC ..... F16D 65/18; F16D 55/22; F16D 2125/60; F16D 2123/00; F16D 2121/04

USPC .......................................................... 188/2 D
See application file for complete search history.

(56) References Cited

U.S. PATENT DOCUMENTS 3,701,400 A * 10/1972 Burnett et al. ................ 188/72.6
3,765,513 A * 10/1973 Brooks ......................... 188/71.9
(Continued)

FOREIGN PATENT DOCUMENTS

| JP | S6453640 U | 4/1989 |
|---|---|---|
| JP | 417873 Y2 | 4/1992 |
| JP | 2002333040 A | 11/2002 |

OTHER PUBLICATIONS

Jananese Office Action for related Application No. 2012-100814 drafted on Feb. 6, 2014, 5 pages.

*Primary Examiner* — Robert A Siconolfi
*Assistant Examiner* — James Hsiao
(74) *Attorney, Agent, or Firm* — Andrew M. Calderon; Roberts Mlotkowski Safran & Cole, P.C.

(57) ABSTRACT

A connecting portion 4f to which a pushrod actuating mechanism 7 is connected is provided on an opposite side, to a disc rotor 5, of a bottom wall of a cylinder bore 4e of a caliper body 4 so as to project therefrom. An accommodation bore 4m that accommodates a pushrod 12 and an adjusting bolt 18 is formed in the connecting portion 4f. In forming the caliper body 4, the connecting portion 4f is formed so as to have the same section shapes when taken along a direction perpendicular to an cylinder axial direction. By cutting the connecting portion 4f so that a length of the connecting portion 4f in the cylinder axial direction becomes a predetermined length and processing the connecting portion 4f, a connecting surface 4n to which the pushrod actuating mechanism 7 is connected is formed on the connecting portion 4f.

21 Claims, 7 Drawing Sheets

(51) Int. Cl.
*F16D 123/00* (2012.01)
*F16D 125/40* (2012.01)
*F16D 125/60* (2012.01)

(56) References Cited

U.S. PATENT DOCUMENTS

| | | | | |
|---|---|---|---|---|
| 4,795,004 A | * | 1/1989 | Bauer | 188/106 P |
| 4,820,946 A | * | 4/1989 | Gutbrod | 310/77 |
| 5,046,404 A | * | 9/1991 | Schnorenberg, Jr. | 92/130 B |
| 5,186,288 A | * | 2/1993 | Sommer | 188/171 |
| 5,529,150 A | * | 6/1996 | Buckley et al. | 188/72.9 |
| 5,788,024 A | * | 8/1998 | Meyer | 188/72.7 |
| 6,311,808 B1 | * | 11/2001 | Halasy-Wimmer et al. | 188/72.6 |
| 6,651,784 B1 | * | 11/2003 | Barbosa et al. | 188/71.9 |
| 7,040,462 B2 | * | 5/2006 | Dennis et al. | 188/59 |
| 7,370,735 B2 | * | 5/2008 | Gilles et al. | 188/72.7 |
| 8,069,961 B2 | * | 12/2011 | Watada | 188/72.8 |
| 2002/0041123 A1 | * | 4/2002 | Runkel et al. | 303/33 |
| 2002/0070084 A1 | * | 6/2002 | Chou | 188/24.11 |
| 2005/0252736 A1 | * | 11/2005 | Leiter et al. | 188/73.1 |
| 2010/0133051 A1 | * | 6/2010 | Trimpe et al. | 188/156 |
| 2013/0299287 A1 | * | 11/2013 | Barbosa et al. | 188/71.9 |

* cited by examiner

MECHANICAL TYPE DISC BRAKE

CROSS REFERENCE TO RELATED APPLICATION

This application is based on and claims priority under 35 U.S.C. §119 to Japanese Patent Application No. 2012-100814 (filed on Apr. 26, 2012), the entire contents of which are incorporated herein by reference.

TECHNICAL FIELD

The invention relates to a disc brake for use in a vehicle such as a motor vehicle, a motorbike, a buggy or a golf cart and more particularly to a mechanical type disc brake that is provided in a caliper body and is actuated by pulling a brake wire to perform a brake operation.

SUMMARY

In many cases, mounting positions of mechanical type disc brakes differ depending upon models of vehicles on which the disc brakes are mounted. Also, depending on the mounting positions, it is concerned that a wheel and a brake wire may interfere with each other. Therefore, depending upon a mounting position, it is required to change shapes of a caliper body and/or a piston member actuating mechanism, and the versatility of the mechanical type disc brake may be deteriorated.

The invention provides a mechanical type disc brake which facilitates changing of a mounting position of a piston member actuating mechanism and enhances the versatility thereof.
(1) According to one embodiment, a mechanical type disc brake includes a caliper body, a caliper body, and a piston member actuating mechanism. The caliper body includes an acting portion that is provided on one side of a disc rotor and is formed with a cylinder bore which opens to a disc rotor side of the acting portion. The piston member is inserted into the cylinder bore so as to be movable. The piston member includes a proximal end portion that project towards an opposite side, to the disc rotor, of the cylinder bore. The piston member actuating mechanism is provided on the opposite side, to the disc rotor, of the cylindrical bore and moves the piston member in a cylinder axial direction as a rotating arm operates. The rotating arm rotates by pulling a brake wire. In forming the caliper body, a connecting portion that has same section shapes when taken along a direction perpendicular to the cylinder axial direction is extended to the opposite side, to the disc rotor, of the cylinder bore, the connecting portion is cut to have a predetermined length to thereby form a connecting surface to which the piston member actuating mechanism is connected, and an accommodation bore that accommodate therein the proximal end portion of the piston member is formed in the connecting portion from a connecting surface side of the piston member.
(2) In the mechanical type disc brake of (1) the cylinder bore may have, in a bottom wall, a through hole extending in the cylinder axial direction. The piston member may include a piston, a pushrod, and a pushing member. The piston is inserted into the cylinder bore so as to be movable. The pushrod has a distal end portion that is connected to the piston, and a proximal end portion that is inserted through the through hole. The pushing member moves in the cylinder axial direction as the rotating arm operates so that a distal end portion of the pushing member is brought into abutment with the proximal end portion of the pushrod to push and move the piston via the pushrod.
(3) In the mechanical type disc brake of (1), the caliper body may be formed by casting. A pad portion that is formed during the casting may be provided on an opposite side, to the disc rotor, of the connecting portion.
(4) In the mechanical type disc brake of (3), the pad portion may include a gate or a riser.
(5) The mechanical type disc brake of (2) may further include a hydraulic type actuating mechanism that actuates the piston by means of a hydraulic pressure. A hydraulic chamber may be provided between the cylinder bore and the piston.
(6) In the mechanical type disc brake of (1), the piston member actuating mechanism may be connected to the connecting surface with a bolt that is disposed on an outer circumferential side of the cylinder bore.
(7) In the mechanical type disc brake of (1), the piston member actuating mechanism may include a connecting base portion, a holding arm, and a restricting piece. The connecting base portion is connected to the connecting surface. The holding arm projects from the connecting base portion to hold the brake wire. The restricting piece restricts the rotating arm from rotating. The connecting base portion, the holding arm, and the restricting piece may be integrally formed by casting.

With the mechanical type disc brake, the mounting position of the piston member actuating mechanism can be changed by adjusting the length by which the connecting portion is cut. Thus, even when the disc brake is mounted on a wheel having a different width, the piston member actuating mechanism can be disposed so that the wheel and the brake wire do not interfere with each other. Therefore, the versatility of the caliper body and the piston member actuating mechanism can be enhanced.

Furthermore, the piston member includes the piston, the pushrod, and the pushing member. The piston is inserted into the cylinder bore so as to be movable. The pushrod has the distal end portion which is connected to the piston, and the proximal end portion that is accommodated in the accommodation bore. The pushing member moves in the cylinder axial direction as the rotating arm operates so that a distal end portion of the pushing member is brought into abutment with the proximal end portion of the pushrod to push and move the piston via the pushrod. With this configuration, it is possible to enhance the assembling properties of the piston member.

Also, the caliper body is formed by casting, and the gate or the riser is provided in the connecting portion. With this configuration, in cutting the gate after casting is completed, the length of the connecting portion can be adjusted easily.

Furthermore, the hydraulic chamber is provided between the cylinder bore and the piston, and the mechanical type disc brake includes the hydraulic type actuating mechanism which actuates the piston by means of a hydraulic pressure. With this configuration, the mechanical type disc brake is applicable to a parking disc brake that includes the hydraulic type actuating mechanism and the mechanical type actuating mechanism.

Also, the piston member actuating mechanism includes the connecting base portion, a wire guide arm, and the restricting piece. The connecting base portion is connected to the connecting surface. The wire guide arm projects from the connecting base portion to hold the brake wire. The restricting piece restricts the rotating arm from rotating. The connecting base portion, the wire guide arm, and the restricting piece are integrally formed by casting. With this configuration, the strength of the piston member actuating mechanism can be ensured, and the restricting piece can be formed easily.

DETAILED DESCRIPTION

Figure 1:
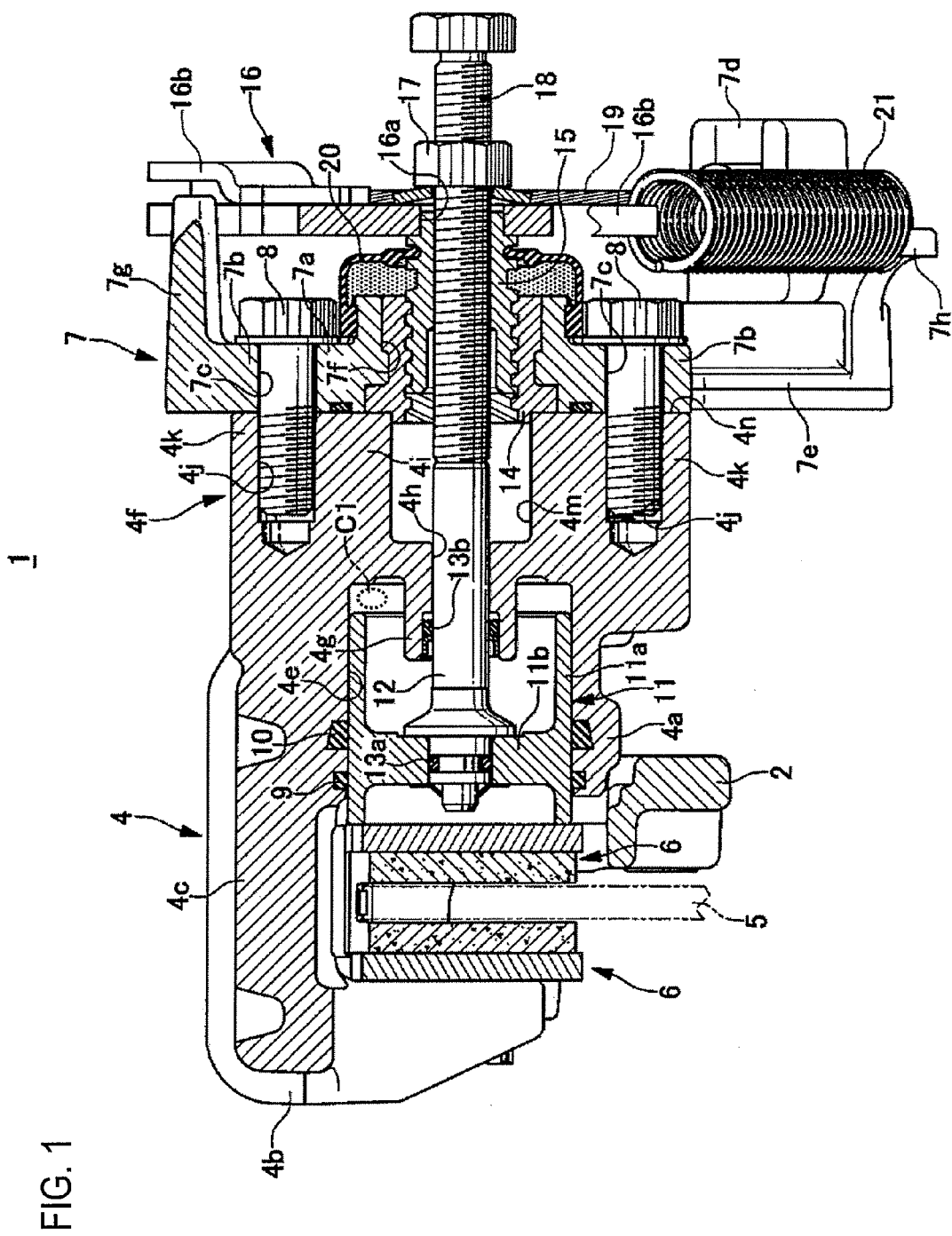
FIG. 1 is a section view taken along a line I-I in FIG. 3.
Figure 2:
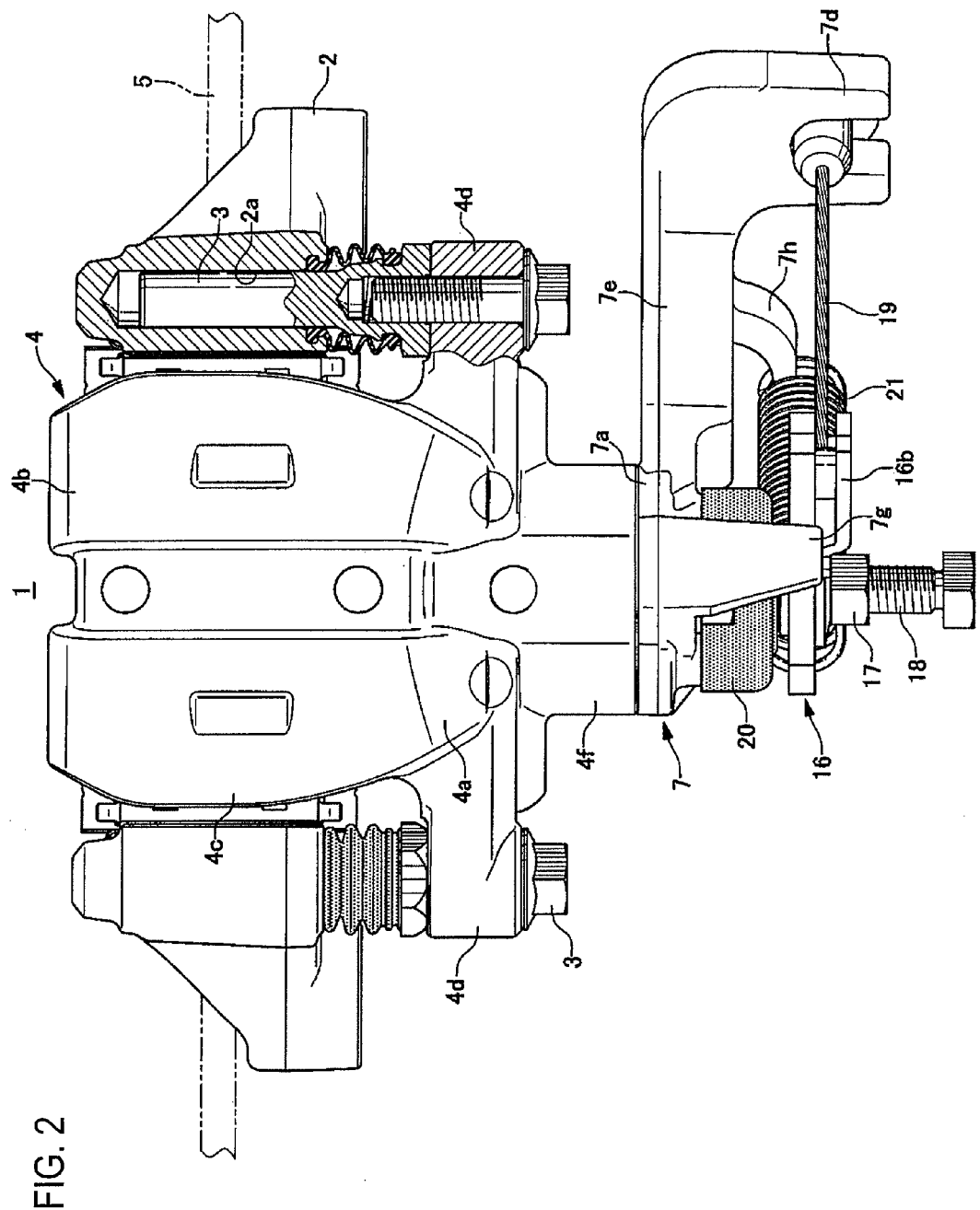
FIG. 2 is a plan view of a mechanical type disc brake according to one embodiment of the invention.
Figure 3:
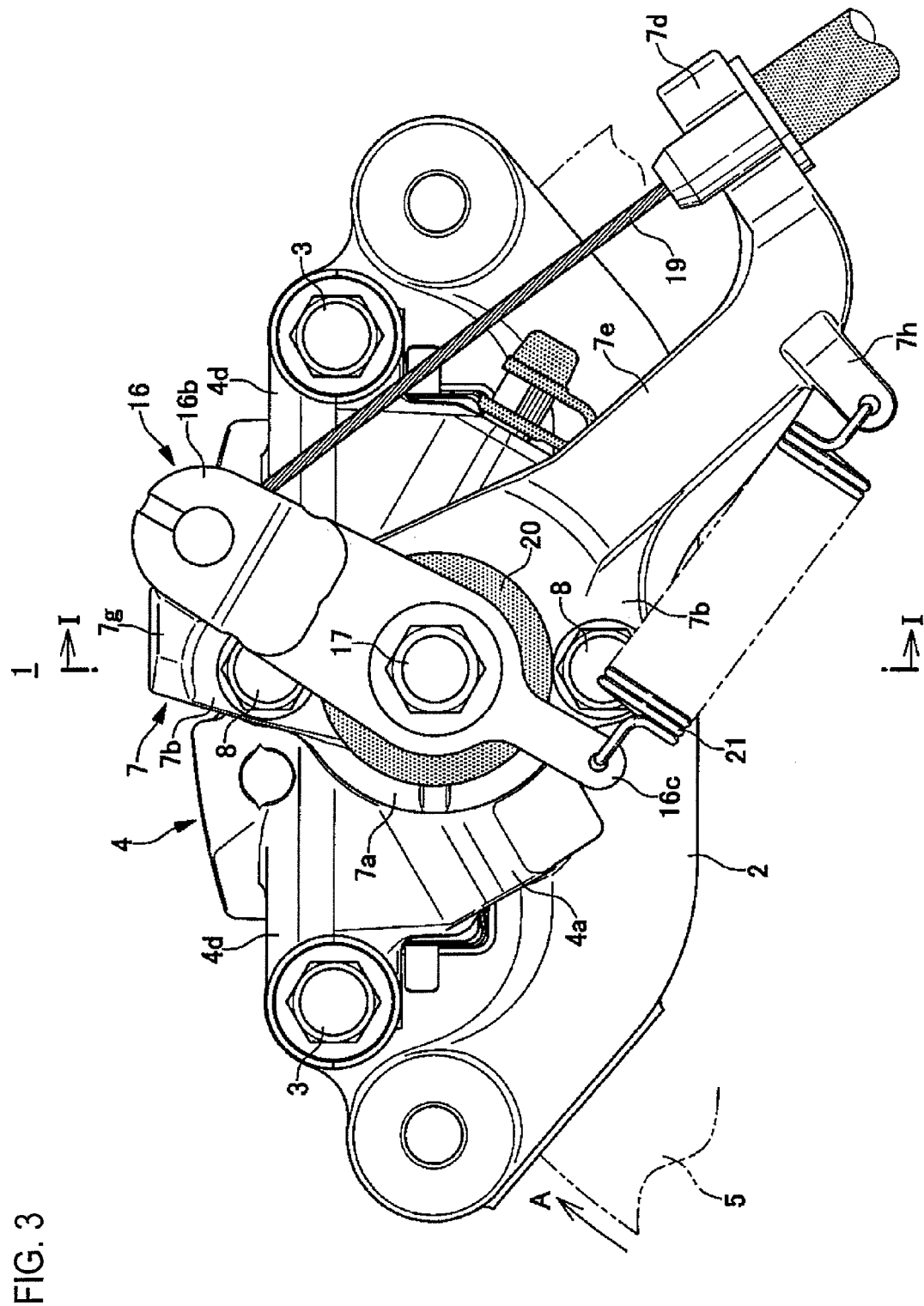
FIG. 3 is a front view of the mechanical type disc brake according to the embodiment of the invention.
Figure 4:
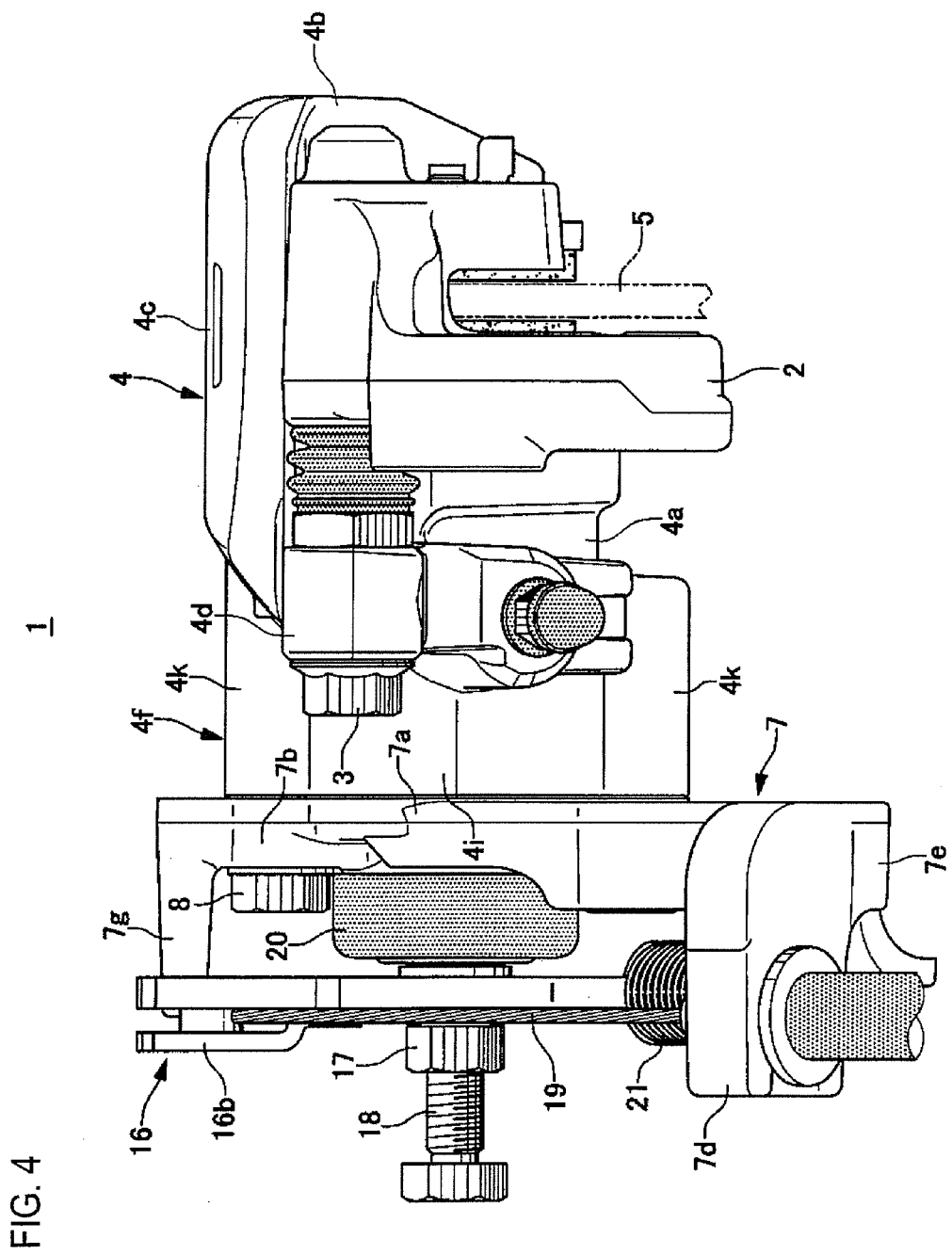
FIG. 4 is a side view of the mechanical type disc brake according to the embodiment of the invention.
Figure 5:
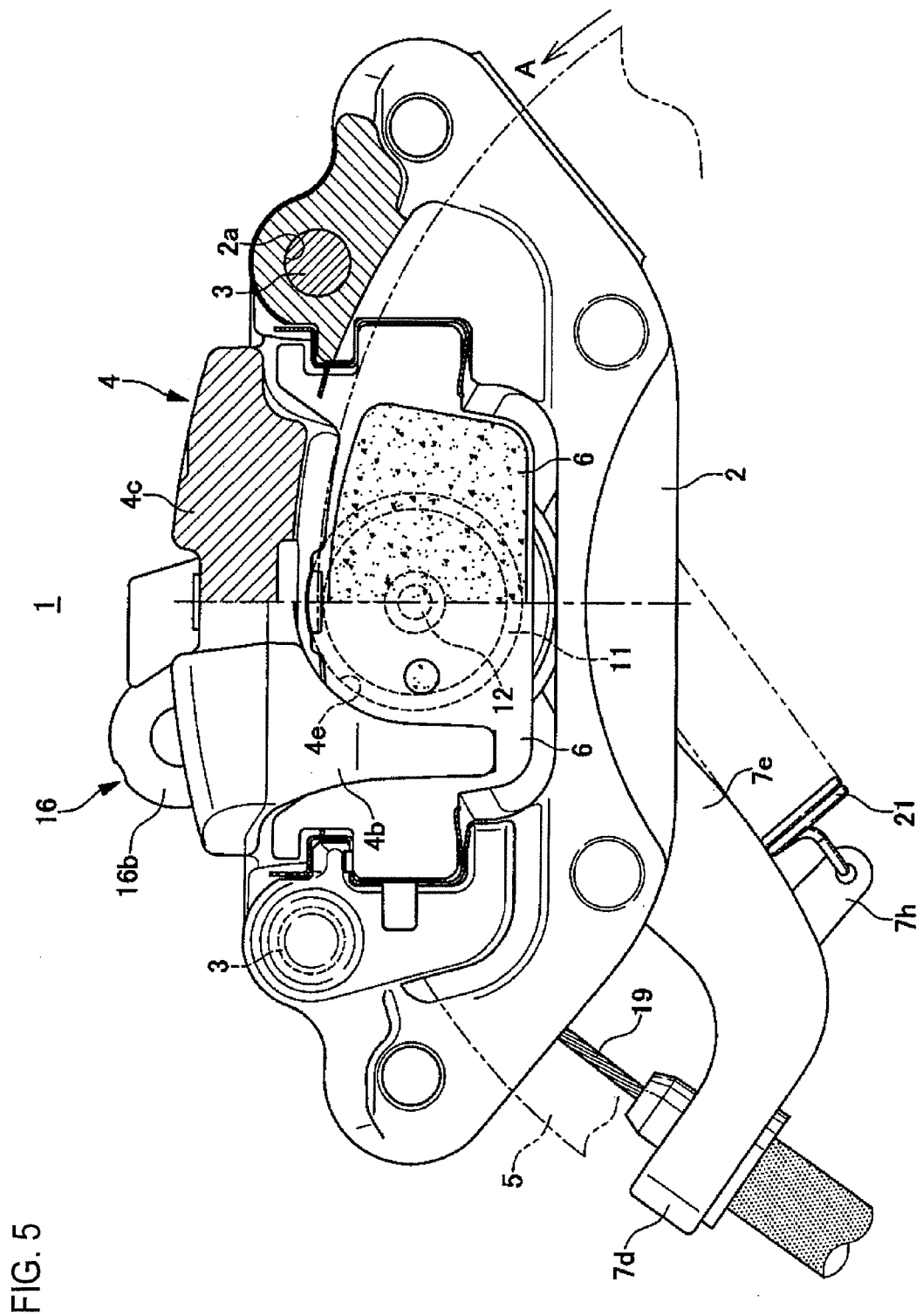
FIG. 5 is a partially section rear view of the mechanical type disc brake according to the embodiment of the invention.
Figure 6:
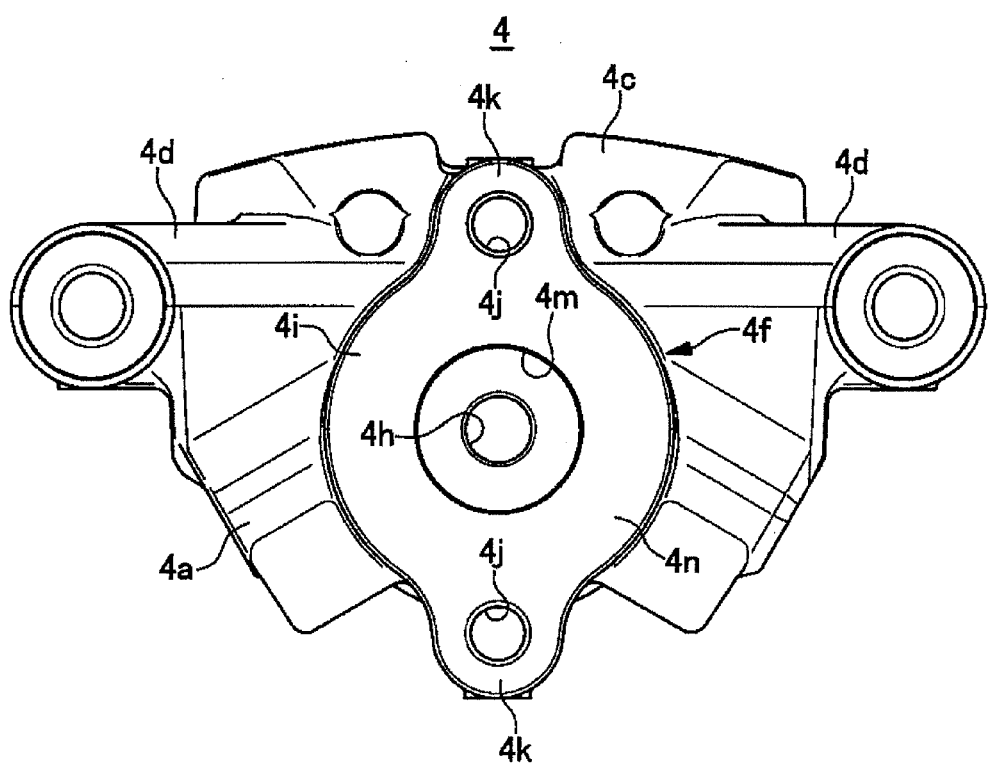
FIG. 6 is a front view of a caliper body of the mechanical type disc brake according to the embodiment of the invention.

FIGS. 1 to 7 show one embodiment of the invention. In the figures, an arrow A denotes a rotation direction of a disc rotor that rotates with integrated with a wheel when a vehicle travels forwards. It is noted that a rotating disc rotor entrance side and a rotating disc rotor exit side, which will be referred to in the following descriptions, denote respective sides when the vehicle travels forwards.

In a mechanical type disc brake 1 according to this embodiment, a bracket 2 fixed to a vehicle body supports, via sliding pins 3, 3, a caliper body 4 so that the caliper body 4 is movable in a disc axial direction.

The caliper body 4 includes an acting portion 4a, a reacting portion 4b, and a bridge portion 4c. The acting portion 4a and the reacting portion 4b are disposed on both side of a disc rotor 5. The bridge portion 4c straddles an outer circumference of the disc rotor 5 to connect the acting portion 4a and the reacting portion 4b. A pair of friction pads 6, 6 is provided between the acting portion 4a and the reacting portion 4b so as to be movable in the disc axial direction with being across the disc rotor 5.

Supporting arms 4d, 4d project from the rotating disc rotor entrance side and the rotating disc rotor exit side of the acting portion 4a. Sliding pins 3, 3 that project from the respective supporting arms 4d, 4d towards the disc rotor 5 are inserted into pin insertion holes 2a, 2a formed in the bracket 2. A cylinder bore 4e is formed in a disc-rotor side portion of the acting portion 4a. The cylinder bore 4e accommodates therein a piston 11 via a dust seal 9 and a piston seal 10. A connecting portion 4f is provided on an opposite side, to the disc rotor 5, of a bottom wall of the cylinder bore 4e so as to project therefrom. A pushrod actuating mechanism 7 (an example of a piston member actuating mechanism) is connected to the connecting portion 4f with connecting bolts 8, 8 (an example of a connecting member).

The piston 11 includes a cylindrical body 11a and a thick pushrod connecting wall 11b that is formed at an intermediate portion of an interior of the cylindrical body 11a. A distal end portion of a pushrod 12 is connected to a central portion of the pushrod connecting wall 11b via a seal member 13a. A boss portion 4g is provided in a central position of the bottom wall of the cylinder bore 4e so as to project therefrom towards the disc rotor 5. A through hole 4h is provided so as to penetrate through the boss portion 4g and the bottom wall in a cylinder axial direction. The pushrod 12 is inserted through the through hole 4h via a seal member 13b. A proximal end portion of the pushrod 12 projects to an opposite side, to the disc rotor 5, of the cylinder bore 4e.

The connecting portion 4f is formed to have the same section shapes when taken along a direction perpendicular to the cylinder axis. The connecting portion 4f includes a cylindrical portion 4i that is larger in diameter than the cylinder bore 4e, and mounting portions 4k, 4k. The mounting portions 4k, 4k project towards a disc outer circumferential side of the cylindrical portion 4i and a disc inner circumferential side of the cylindrical portion 4i, respectively. The mounting portions 4k, 4k include female screw holes 4j, 4j in which the connecting bolts 8, 8 are fastened. An accommodation bore 4m is formed in a central portion of the cylindrical portion 4i so as to communicate with the through hole 4h and to open to an opposite side to the disc rotor 5. The accommodation bore 4m accommodates the proximal end portion of the pushrod 12.

Figure 7:
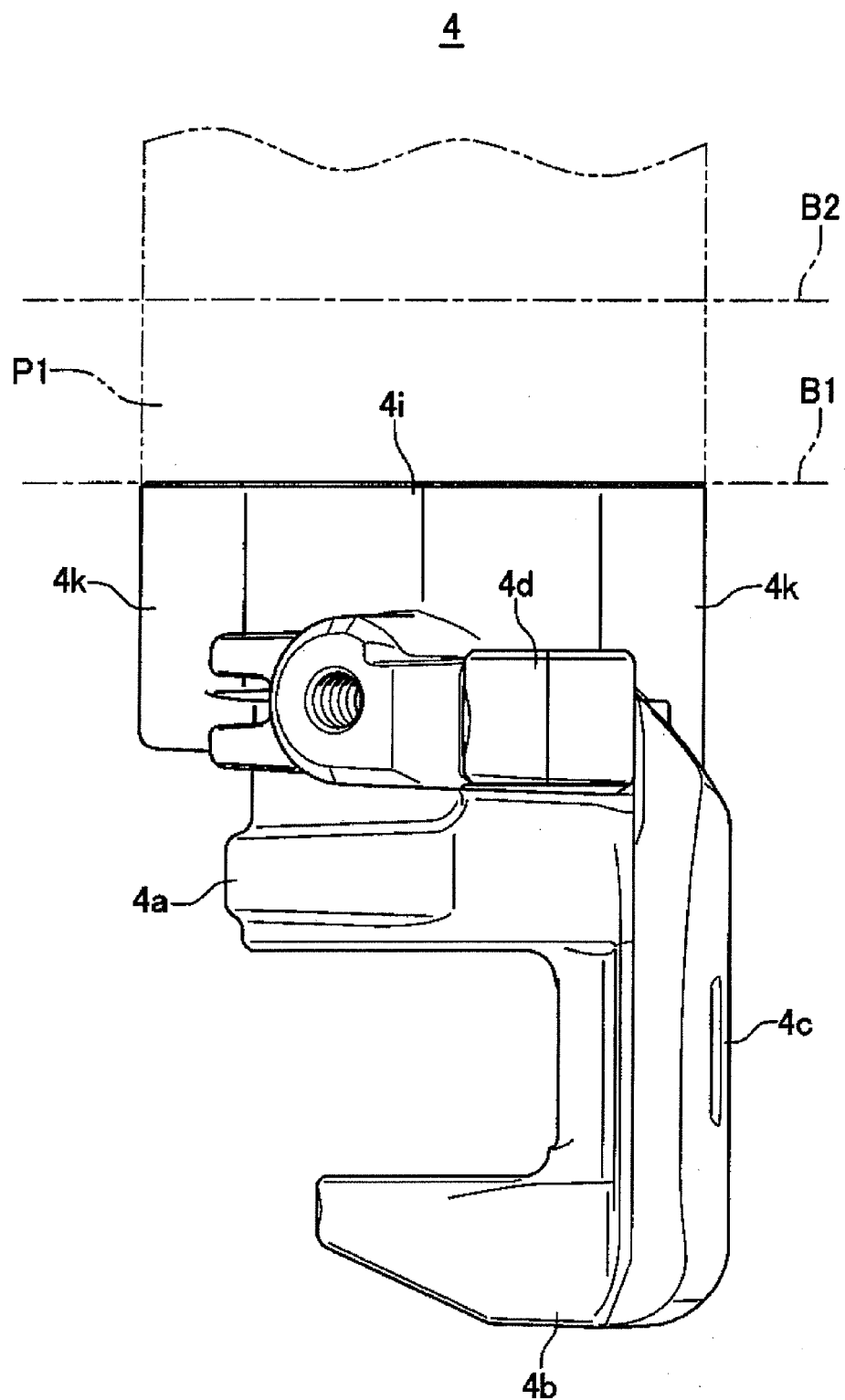
FIG. 7 is a side view of the caliper body of the mechanical type disc brake according to the embodiment of the invention.

In the case where the caliper body 4 is formed by casting, as shown in FIG. 7, a gate P1 is provided at the connecting portion 4f. After casting, the gate P1 is cut according to the size of a wheel by cutting the connecting portion 4f in the direction perpendicular to the cylinder axial direction. Thereby, a connecting portion 4f having a predetermined length and a connecting surface 4n are formed.

The pushrod actuating mechanism 7 includes a connecting base portion 7a, a sleeve nut 14, a sleeve bolt 15, a rotating arm 16, and an adjusting bolt 18 (an example of a pushing member). The connecting base portion 7a is connected to the connecting surface 4n. The sleeve nut 14 is cast in a position corresponding to the accommodation bore 4m. The sleeve bolt 15 is screwed into the sleeve nut 14 from an opposite side, to the disc rotor 5, thereof. The rotating arm 16 is fitted on an outer end portion of the sleeve bolt 15. In a state where a lock nut 17 is mounted on the adjusting bolt 18, the adjusting bolt 18 is screwed into an inner circumference of the sleeve bolt 15 and a distal end portion of the adjusting bolt 18 abuts against the proximal end portion of the pushrod 12. The adjusting bolt 18 pushes the piston 11 via the pushrod 12 towards the disc rotor 5. The rotating arm 16, the sleeve bolt 15 and the adjusting bolt 18 can rotate together by tightening the lock nut 17. In this embodiment, the piston 11, the pushrod 12 and the adjusting bolt 18 exemplarily makes up a piston member.

The connecting base portion 7a has a disc shape which is substantially the same shape as that of the connecting portion 4f of the caliper body 4. Bolt mounting portions 7b, 7b correspond to the mounting portions 4k, 4k. The bolt mounting portions 7b, 7b are provided on a disc outer circumferential side and a disc inner circumferential side of the connecting base portion 7a so as to project therefrom. Bolt insertion holes 7c, 7c are formed in the bolt mounting portions 7b, 7b so as to be coaxial with the female screw holes 4j, 4j. Furthermore, a holding arm 7e extends towards a rotating disc exit side of the bolt mounting portion 7b, which is on the disc inner circumferential side of the connecting base portion 7a. The holding arm 7e has a holding portion 7d that holds a brake wire 19 at a distal end portion thereof. A mounting hole 7f in which the sleeve nut 14 is mounted is formed in a position corresponding to the accommodation hole 4m. Furthermore, a restricting piece 7g is provided on a disc outer circumferential side of the bolt mounting portion 7b, which is on the disc outer circumferential side of the connecting base portion 7a. The restricting portion 7g projects in an opposite side to the disc rotor 5 and abuts against a surface, on a rotating disc rotor entrance side, of the rotating arm 16 so as to restrict the rotation of the rotating arm 16. Furthermore, a return spring attaching piece 7h is provided on the holding arm 7e so as to project therefrom. Also, the connecting base portion 7a, the bolt mounting portions 7b, 7b, the holding arm 7e, and the restricting piece 7g are formed integrally by casting.

The sleeve nut 14 is formed with a multiple thread female screw portion on an inner circumferential surface thereof. The sleeve bolt 15 is formed with a multiple thread male screw portion that screws with the multiple thread female screw portion of the sleeve nut 14. Also, an inner circumferential surface of the sleeve bolt 15 has a cylindrical shape and is formed with a female screw portion with which the adjusting bolt 18 screws. The sleeve bolt 15 projects outwardly from the opposite side, to the disc rotor 5, of the sleeve nut 14. A dust boot 20 is mounted between the projecting portion of the sleeve bolt 15 and the connecting base portion 7a.

The rotating arm 16 has a sleeve bolt fitting hole 16a, a brake wire connecting portion 16b and a mounting piece 16c. The sleeve bolt fitting hole 16a is fitted onto an outer end of an outer circumferential portion of the sleeve bolt 15. The brake wire connecting portion 16b projects towards the disc outer circumferential side. One end of the brake wire 19, which is held by the holding arm 7e, is connected to the brake wire connecting portion 16b. The mounting piece 16c projects towards the disc inner circumferential side. One end of a return spring 21 is mounted on the mounting piece 16c. The other end of the brake wire 19, which is connected to the brake wire connecting portion 16b at the one end thereof, is connected to a brake pedal and/or a brake lever (not shown) which are provided near a driver's seat. Also, the other end of the return spring 21 is attached to the return spring attaching piece 7h, which projects from the holding arm 7e. When being not in operation, the rotating arm 16 is biased by the return spring 21 and is restricted from rotating by the restricting piece 7g to thereby be held in an initial position. Thereby, the adjusting bolt 18 and the pushrod 12 are disposed in their initial positions shown in the drawings.

The pushrod actuating mechanism 7, which is configured as described above, is attached to the connecting surface 4n by bringing the connecting base portion 7a into abutment with the connecting surface 4n and inserting the connecting bolts 8, 8 through the connecting bolt insertion holes 7a, 7a so as to screw with the female screw holes 4j, 4j. Then, the adjusting bolt 18 is inserted within the accommodating bore 4m as a result of the attachment of the pushrod actuating mechanism 7 to the connecting surface 4n. Thereby, the proximal end portion of the pushrod 12 is brought into abutment with the distal end portion of the adjusting bolt 18.

In this disc brake 1, when the brake wire 19 is pulled by a driver's brake operation, the rotating arm 16 rotates against the biasing force of the return spring 21. Then, as the rotating arm 16 rotates, the sleeve bolt 15 moves towards the disc rotor 5 while rotating, and the adjusting bolt 18 moves towards the disc rotor 5 while rotating integrally with the sleeve bolt 15, so as to push and move the pushrod 12 towards the disc rotor 5. As the pushrod 12 moves, the pushrod 12 pushes and moves the piston 11 towards the disc rotor 5, so that the piston 11 presses a friction pad 6, which is on an acting portion 4a side, against one side surface of the disc rotor 5. Furthermore, due to a reaction force produced, the caliper body 4 is moved towards the acting portion 4a while being guided by the sliding pins 3, 3. Then, the reacting portion 4b presses the friction pad 6 on a reacting portion 4b side against the other side surface of the disc rotor 5 to thereby perform the brake action.

With the mechanical type disc brake 1 of this embodiment, which is configured as described above, if a length by which the connecting portion 4f is cut is adjusted according to a length of a wheel, the mounting position of the pushrod actuating mechanism 7 can be changed. Thus, even if the brake disc 1 is mounted on a wheel having a different width, the pushrod actuating mechanism 7 can be disposed so that the wheel and the brake wire 19 do not interfere with each other. Thereby, it is possible to enhance the versatility of the caliper body 4 and the pushrod actuating mechanism 7. In this embodiment, the connecting portion 4f is cut in a position B1 in FIG. 7 according to the position of the wheel. However, for example, when the position of the wheel is different, the connecting portion 4f may be cut in a position B2 in FIG. 7 according to the position of the wheel so that the connecting portion 4f has a predetermined length. Also, the caliper body 4 is formed by casting, and the gate P1 is provided in the connecting portion. Thus, when the gate P1 is cut after casting is completed, the length of the connecting portion 4f can be adjusted easily. Furthermore, the connecting base portion 7a which is connected to the connecting surface 4n, the holding arm 7e projecting from the connecting base portion 7a and having the distal end portion through which the brake wire 19 is inserted, and the restricting piece 7g which restricts the rotation of the rotating arm 16 are formed integrally by casting. Thereby, the strength of the pushrod actuating mechanism 7 can be ensured, and the restricting piece 7g can be formed easily.

It should be noted that the invention is not limited to the embodiment described above. For example, the disc brake 1 may include a hydraulic type actuating mechanism in which a hydraulic fluid port C1 is provided in the cylinder bore as indicated by an imaginary line in FIG. 1, a hydraulic chamber is provided between the cylinder bore and the piston, and the piston is actuated by a hydraulic pressure. Also, the disc brake 1 is applicable to a parking type disc brake including the hydraulic type actuating mechanism and the mechanical type actuating mechanism. Furthermore, the piston, the pushrod, and the adjusting bolt may be formed integrally. Also, the disc brake 1 may be applied to a disc brake in which a bottom wall is not provided in a cylinder bore.

What is claimed is:

1. A mechanical type disc brake comprising:
    a caliper body including an acting portion that is provided on one side of a disc rotor and is formed with a cylinder bore which opens to a disc rotor side of the acting portion;
    a piston member that is inserted into the cylinder bore so as to be movable, wherein the piston member includes a proximal end portion that project towards an opposite side to the disc rotor, of the cylinder bore; and
    a piston member actuating mechanism that is provided on the opposite side, to the disc rotor, of the cylindrical bore and moves the piston member in a cylinder axial direction as a rotating arm operates, wherein
    the rotating arm rotates by pulling a brake wire, and
    wherein,
        a connecting portion has same section shapes when taken along a direction perpendicular to the cylinder axial direction at different positions located on the cylindrical axis,
        the connecting portion has a predetermined length to form a connecting surface to which the piston member actuating mechanism is connected, and
        an accommodation bore that is larger than a diameter of a pushrod of the piston member and which accommodates therein the proximal end portion of the piston member in the connecting portion, from a connecting surface side of the piston member.

2. The mechanical type disc brake according to claim 1, wherein
    the cylinder bore has, in a bottom wall, a through hole extending in the cylinder axial direction, and
    the piston member includes
        a piston that is inserted into the cylinder bore so as to be movable,
        a pushrod having
            a distal end portion that is connected to the piston, and a proximal end portion that is inserted through the through hole, and a pushing member that moves in the cylinder axial direction as the rotating arm operates so that a distal end portion of the pushing member is brought into abutment with the proximal end portion of the pushrod to push and move the piston via the pushrod.

3. The mechanical type disc brake according to claim 1, wherein the caliper body is a casting, and a pad portion that is provided on an opposite side to the disc rotor, of the connecting portion.

4. The mechanical type disc brake according to claim 3, wherein the pad portion includes a gate or a riser.

5. The mechanical type disc brake according to claim 2, further comprising:

a hydraulic type actuating mechanism that actuates the piston by means of a hydraulic pressure, wherein a hydraulic chamber is provided between the cylinder bore and the piston.

6. The mechanical type disc brake according to claim 1, wherein the piston member actuating mechanism is connected to the connecting surface with a bolt that is disposed on an outer circumferential side of the cylinder bore.

7. The mechanical type disc brake according to claim 1, wherein the piston member actuating mechanism includes:

a connecting base portion that is connected to the connecting surface, a holding arm that projects from the connecting base portion to hold the brake wire, and a restricting piece that restricts the rotating arm from rotating, and the connecting base portion, the holding arm, and the restricting piece are an integrally casted piece.

8. A method for manufacturing a mechanical type disc brake, wherein the disc brake includes a caliper body including an acting portion that is provided on one side of a disc rotor and is formed with a cylinder bore which opens to a disc rotor side of the acting portion;

a piston member including a proximal end portion that project towards an opposite side, to the disc rotor, of the cylinder bore; and a piston member actuating mechanism that moves the piston member in a cylinder axial direction as a rotating arm operates, and the rotating arm rotates by pulling a brake wire, the method comprising:

forming the caliper body;

inserting the piston member into the cylinder bore of the caliper body;

providing the piston member actuating mechanism on the opposite side, to the disc rotor, of the cylindrical bore of the caliper body, wherein the forming of the caliper body includes extending a connecting portion, which has same section shapes when taken along a direction perpendicular to the cylinder axial direction at different positions located on the cylindrical axis, cutting the connecting portion to have a predetermined length, the cutting forming a connecting surface to which the piston member actuating mechanism is connected, and forming an accommodation bore, which accommodate therein the proximal end portion of the piston member, in the connecting portion from a connecting surface side of the piston member.

9. The mechanical type disc brake according to claim 1, wherein the cylinder bore accommodates therein the piston member with a dust seal and a piston seal.

10. The mechanical type disc brake according to claim 1, wherein, the piston member includes a cylindrical body and a pushrod connecting wall that is formed at an intermediate portion of an interior of the cylindrical body;

a distal end portion of a pushrod is connected to a central portion of the pushrod connecting wall via a seal member;

the pushrod is inserted through a through hole located between the cylinder bore and the accommodation bore which are of different diameters, with a seal member; and a proximal end portion of the pushrod projects to an opposite side, to the disc rotor, of the cylinder bore.

11. The mechanical type disc brake according to claim 10, wherein, the connecting portion includes a cylindrical portion that is larger in diameter than the cylinder bore, and mounting portions which project towards a disc outer circumferential side of the cylindrical portion and a disc inner circumferential side of the cylindrical portion, respectively.

12. The mechanical type disc brake according to claim 1, wherein the piston actuating mechanism includes:

a connecting base portion, a sleeve nut, a sleeve bolt, the rotating arm, and an adjusting bolt, the connecting base portion is connected to the connecting surface, the sleeve nut is in a position corresponding to the accommodation bore, and the rotating arm is fitted on an outer end portion of the sleeve bolt.

13. The mechanical type disc brake according to claim 12, wherein, in a state where a lock nut is mounted on the adjusting bolt, the adjusting bolt is screwed into an inner circumference of the sleeve bolt and a distal end portion of the adjusting bolt abuts against the proximal end portion of the pushrod.

14. The mechanical type disc brake according to claim 13, wherein, the adjusting bolt pushes the piston member via the pushrod towards the disc rotor, and the rotating arm, the sleeve bolt and the adjusting bolt rotate together by tightening the lock nut.

15. The mechanical type disc brake according to claim 12, wherein the connecting base portion has a disc shape which is substantially a same shape as that of the connecting portion.

16. The mechanical type disc brake according to claim 15, further comprising:

a holding arm extending towards a rotating disc exit side of a bolt mounting portion, which is on a disc inner circumferential side of the connecting base portion, and the holding arm has a holding portion that holds the brake wire at a distal end portion thereof.

17. The mechanical type disc brake according to claim 16, further comprising:

a restricting piece provided on a disc outer circumferential side of the bolt mounting portion, which is on the disc outer circumferential side of the connecting base portion, and the restricting portion projects in an opposite side to the disc rotor and abuts against a surface, on a rotating disc rotor entrance side, of the rotating arm so as to restrict rotation of the rotating arm.

18. The mechanical type disc brake according to claim 17, further comprising a return spring attaching piece provided on the holding arm so as to project therefrom.

19. The mechanical type disc brake according to claim 18, wherein, the rotating arm has a sleeve bolt fitting hole, a brake wire connecting portion and a mounting piece, the sleeve bolt fitting hole is fitted onto an outer end of an outer circumferential portion of the sleeve bolt, and the brake wire connecting portion projects towards the disc outer circumferential side, and one end of the brake wire, which is held by the holding arm, is connected to the brake wire connecting portion.

20. The mechanical type disc brake according to claim 19, wherein, when not in operation, the rotating arm is biased by the return spring and is restricted from rotating by the restricting piece to thereby be held in an initial position.

21. The method for manufacturing a mechanical type disc brake of claim 8, wherein the accommodation bore is larger than a diameter of a pushrod of the piston member and which accommodates therein the proximal end portion of the piston member in the connecting portion, from a connecting surface side of the piston member.

* * * * *